(12) United States Patent
Guo

(10) Patent No.: US 11,827,340 B2
(45) Date of Patent: Nov. 28, 2023

(54) AERIAL VEHICLE WITH ROTOR BLADE ASSEMBLY HAVING ROTOR BLADE INCLUDING VORTEX GENERATOR

(71) Applicant: Hangzhou Zero Zero Technology Co., Ltd., Zhejiang (CN)

(72) Inventor: Liqiang Guo, Zhejiang (CN)

(73) Assignee: Hangzhou Zero Zero Technology Co., Ltd

( * ) Notice: Subject to any disclaimer, the term of this patent is extended or adjusted under 35 U.S.C. 154(b) by 528 days.

(21) Appl. No.: 16/823,707

(22) Filed: Mar. 19, 2020

(65) Prior Publication Data

US 2020/0398971 A1 Dec. 24, 2020

Related U.S. Application Data

(60) Provisional application No. 62/864,671, filed on Jun. 21, 2019.

(51) Int. Cl.
*B64C 23/06* (2006.01)
*B64C 39/02* (2023.01)
*B64C 27/467* (2006.01)
*B64U 10/13* (2023.01)
*B64U 30/20* (2023.01)

(52) U.S. Cl.
CPC ............ *B64C 23/06* (2013.01); *B64C 27/467* (2013.01); *B64C 39/024* (2013.01); *B64U 10/13* (2023.01); *B64U 30/20* (2023.01)

(58) Field of Classification Search
None
See application file for complete search history.

(56) References Cited

U.S. PATENT DOCUMENTS

| | | | | |
|---|---|---|---|---|
| 3,578,264 A | * | 5/1971 | Kuethe | F28F 1/32 181/220 |
| 4,650,138 A | * | 3/1987 | Grose | B64C 21/10 244/130 |
| 4,822,249 A | * | 4/1989 | Eckardt | F01D 5/145 416/235 |
| 10,155,585 B2 | * | 12/2018 | Johannesson | B64C 27/50 |
| 2007/0284848 A1 | * | 12/2007 | Brownlie | A63B 59/70 280/288.1 |
| 2012/0282105 A1 | * | 11/2012 | Grife | F03D 1/0675 249/102 |
| 2016/0001879 A1 | * | 1/2016 | Johannesson | B64C 27/50 416/142 |

* cited by examiner

*Primary Examiner* — Juan G Flores
(74) *Attorney, Agent, or Firm* — Endurance Law Group PLC; James R. Yee

(57) ABSTRACT

An unmanned aerial vehicle includes a fuselage body and a lift mechanism. The lift mechanism includes a rotor blade assembly and a rotary driving member and defines an axis of rotation. The lift being mechanism is coupled to the fuselage body. The rotary driving member is configured to controllably rotate the rotor blade assembly about the axis of rotation. The rotor blade assembly includes at least one rotor blade. The at least one rotor blade including a vortex generator defined along an upper surface of the rotor blade.

6 Claims, 18 Drawing Sheets

Table 1 – Basic Blade Efficiency

| actual speed of revolution (rpm) | force (g) | torque (mN·m) | input power (W) | efficiency (g/W) |
|---|---|---|---|---|
| 3006 | 178 | 31.6 | 14.179 | 12.554 |
| 3520 | 246.5 | 42.7 | 21.563 | 11.432 |
| 4011 | 331 | 56 | 32.249 | 10.264 |
| 4508 | 426 | 70.4 | 45.88 | 9.285 |
| 5002 | 535 | 86.9 | 64.121 | 8.344 |

FIG. 11

Table 2 – Effect of Force After Additional Flow Interference

| actual speed of revolution (rpm) | force (g) | torque (mN·m) | input power (W) | efficiency (g/W) |
|---|---|---|---|---|
| 3013 | 187.5 | 31.2 | 14.053 | 13.5 |
| 3501 | 257 | 42 | 21.413 | 12.138 |
| 4008 | 338.5 | 54.6 | 31.376 | 10.806 |
| 4503 | 426 | 67.8 | 44.486 | 9.747 |
| 4987 | 520 | 82.2 | 61.232 | 8.715 |

FIG. 12

AERIAL VEHICLE WITH ROTOR BLADE ASSEMBLY HAVING ROTOR BLADE INCLUDING VORTEX GENERATOR

CROSS-REFERENCE TO RELATED APPLICATION(S)

The present application claims priority to and the benefit of U.S. Provisional Patent Application 62/864,671 filed Jun. 21, 2019, the entire disclosure of which is incorporated by referenced.

TECHNICAL FIELD

This invention relates generally to the unmanned aerial vehicles, and more specifically, to an unmanned aerial vehicle having a rotor blade including miniature vortex generators.

BACKGROUND OF THE INVENTION

When rotorcraft propeller are used in unmanned aerial vehicles, e.g., drones, the higher efficiency will lead to longer cruise duration under the same power. For most of the multi-rotor aircrafts, cruise duration is always a major weak point due to various restrictions such as load. It is increasingly important to design a more efficient propeller under demand. For a completed propeller design, it would be beneficial if any modification can be applied to it to further improve its efficiency.

At the same time, the consumer-grade UAV will usually interact with people during the use, it is hoped that the noise of the aircraft will be as low as possible. The main cause of the noise of the multi-rotor aircraft is the propeller rotation noise.

The propellers of the prior art generally adopt a smooth surface, and some of the propellers improve the performance by roughen the front part or the rear part of the propeller surface. The above method is not fully applicable for all kinds of propellers, and sometimes it even will reduce the efficiency of the propeller.

The present invention is aimed at one or more of the problems identified above.

SUMMARY OF THE INVENTION

In one aspect of the present invention, an unmanned aerial vehicle is provided. The unmanned aerial vehicle includes a fuselage body and a lift mechanism. The lift mechanism includes a rotor blade assembly and a rotary driving member and defines an axis of rotation. The lift mechanism is coupled to the fuselage body. The rotary driving member is configured to controllably rotate the rotor blade assembly about the axis of rotation. The rotor blade assembly includes at least one rotor blade. The at least one rotor blade includes a vortex generator defined along an upper surface of the rotor blade.

In another aspect of the present invention, a rotor blade assembly for use in an aerial vehicle, is provided. The aerial vehicle includes a fuselage body and a lift mechanism. The lift mechanism includes a rotor blade assembly and a rotary driving member and defines an axis of rotation. The lift being mechanism is coupled to the fuselage body. The rotary driving member is configured to controllably rotate the rotor blade assembly about the axis of rotation. The rotor blade assembly includes at least one rotor blade and a vortex generator defined along an upper surface of the rotor blade. The at least one rotor blade and the vortex generator are unitarily formed using an injection molding process. The vortex generator includes one or more generator portions. Each generator portion is formed as one of a depression and protrusion. The rotor blade assembly includes a rotor blade attachment mechanism. Each of the at least one rotor blade having as associated longitudinal spanwise axis that extends between a root portion and an opposing tip portion and an associated chordwise axis that extends between a leading edge and a trailing edge. The at least one rotor blade is mounted to the rotor blade attachment mechanism at the root portion.

BRIEF DESCRIPTION OF THE FIGURES

FIG. 11 is Table 1 illustrating Basic Blade Efficiency.

FIG. 12 is Table 2 illustrating Effect of Force after Additional Flow Interference.

DETAILED DESCRIPTION OF THE INVENTION

Figure 1:
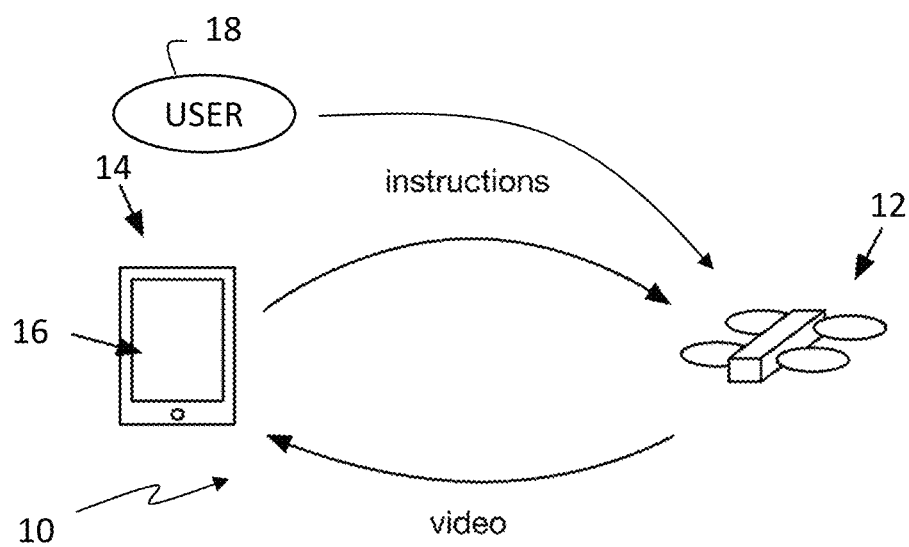
FIG. 1 is a schematic representation of an aerial system for controlling an unmanned aerial vehicle, according to an embodiment of the present invention.

An autonomous aerial system is described and illustrated herein. In one embodiment, the aerial system is a so-called "hopter", unmanned aerial vehicle or drone. The aerial system may be activated by a user, released, and may then hover in the air. While hovering, the aerial system may automatically take pictures and videos for the user with minimum interaction or remote control from the user. After the aerial system has completed taking pictures or videos, the aerial system may perform a controlled landing.

In general, the present invention is directed to an unmanned aerial vehicle that includes a rotor blade having a plurality of vortex generators defined along the upper surface of the rotor blade. The vortex generators are designed as an effective flow control device that operates to generate a flow vortex to enhance the energy exchange between the low-energy fluid and the mainstream high-energy fluid in the boundary layer, and delay boundary layer separation across the blade airfoil.

The following description of the embodiments of the invention is not intended to limit the invention to these embodiments, but rather to enable any person skilled in the art to make and use this invention. With reference to the drawings and in operation, a system 10 for controlling an aerial vehicle 12, for example a drone or other unmanned aerial vehicle, is provided. The system 10 may include a remote device 14 with a control client 16. The control client 16 provides a user interface that allows a user 18 to send instructions to the aerial vehicle 12 to control operation thereof. As discussed in more depth below, the aerial vehicle 12 includes one or more cameras for obtaining pictures and/or video which may be sent to the remote device 14 and/or stored in memory on the aerial vehicle 12.

Overview of the System 10 and the Aerial Vehicle 12

Figure 2:
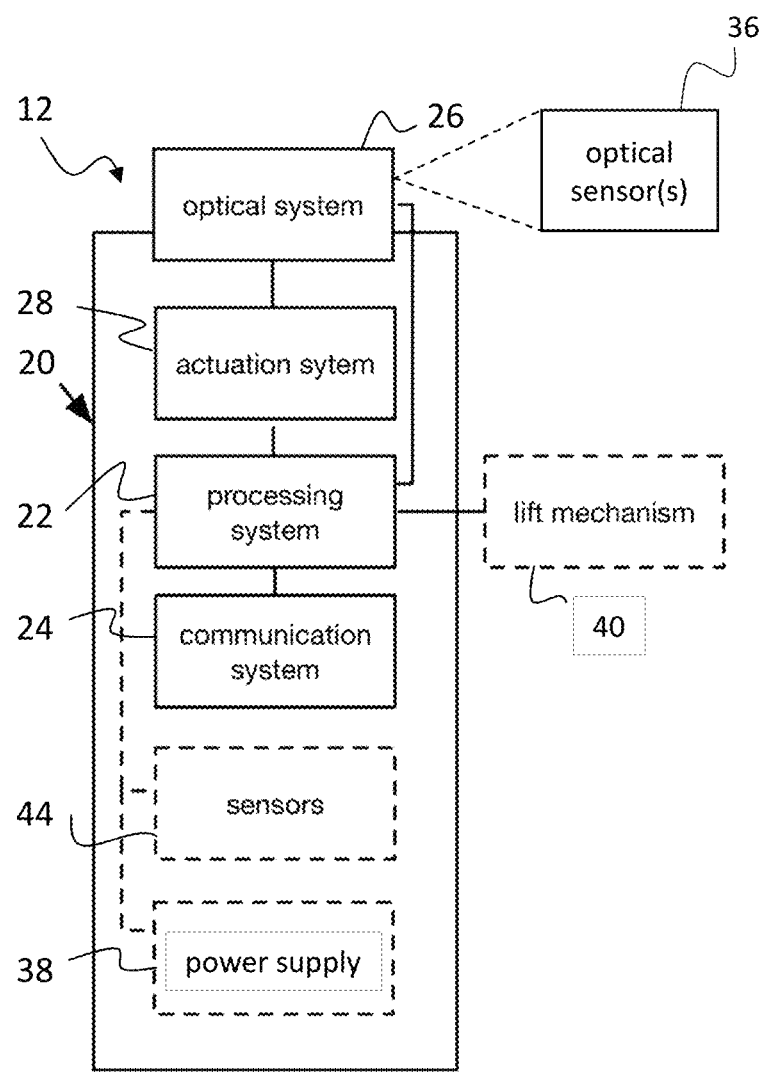
FIG. 2 is a schematic representation of an unmanned aerial vehicle that may be used with the aerial system shown in FIG. 1, according to an embodiment of the present invention.
Figure 3:
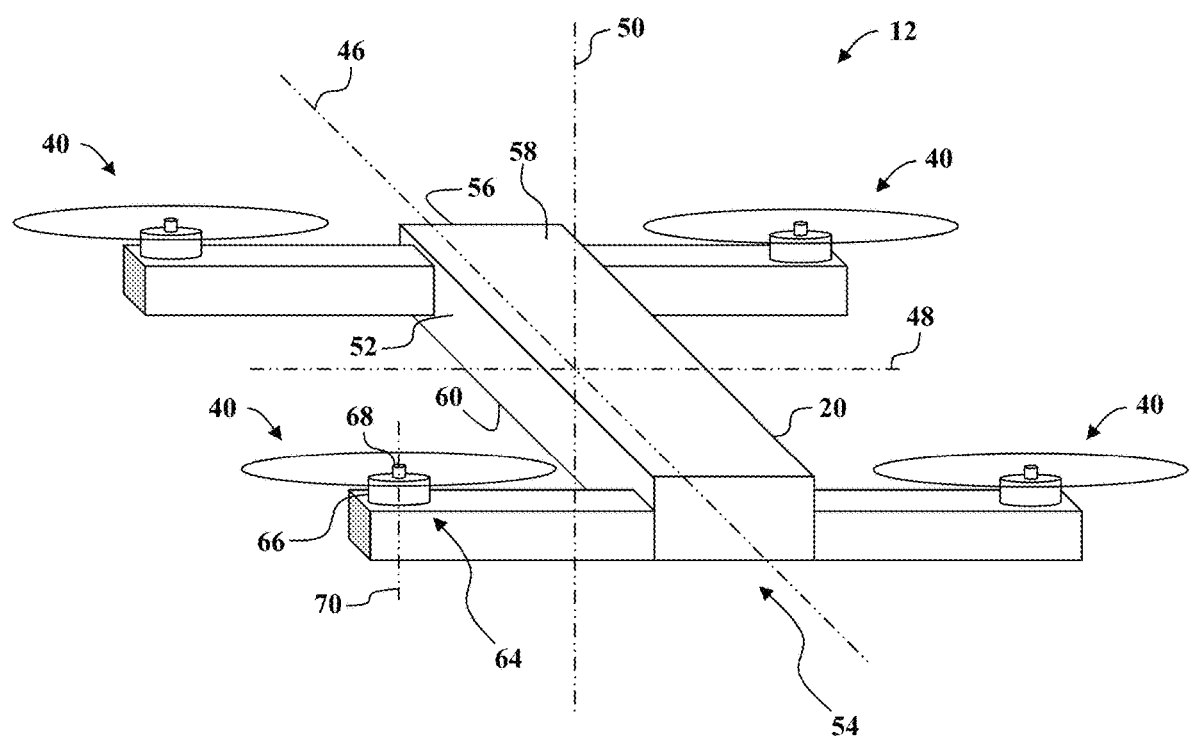
FIG. 3 is perspective view of an unmanned aerial vehicle that may be used with the aerial system shown in FIG. 1, according to an embodiment of the present invention.
Figure 4:
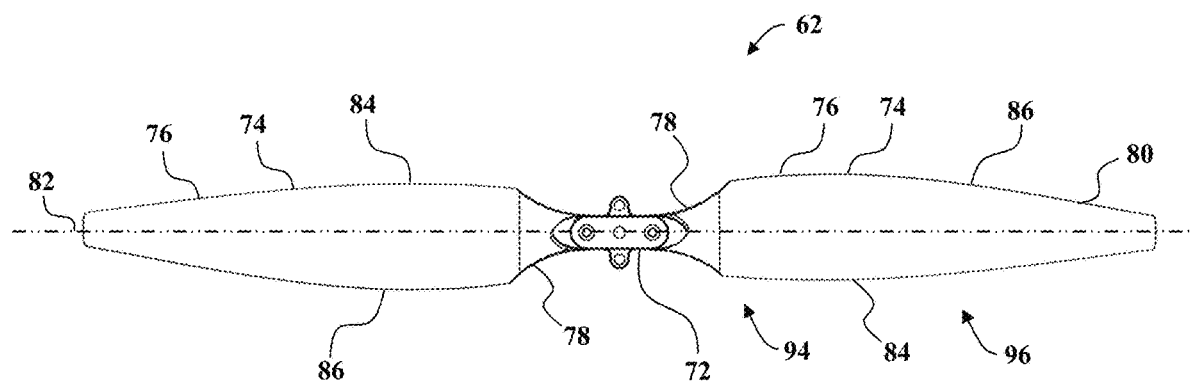
FIG. 4 is a top view of a rotor blade assembly that may be used with the unmanned aerial vehicle shown in FIG. 3, according to an embodiment of the present invention.

An exemplary aerial vehicle 12 and control system 10 is shown in FIGS. 1-3. The control client 16 of the aerial vehicle 12 functions to receive data from the aerial vehicle 12, including video images and/or video, and control visual display on the remote device 14. The control client 16 may also receive operation instructions and facilitate aerial vehicle 12 remote control based on operation instructions. The control client 16 is preferably configured to execute on a remote device 14 but can alternatively be configured to execute on the aerial vehicle 12 or on any other suitable system. As discussed above, and more fully below, the aerial vehicle 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial vehicle 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial vehicle 12 functions to fly within a physical space, capture video, stream the video in near-real time to the remote device 14, and operate based on operation instructions received from the remote device 14.

The aerial vehicle 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial vehicle 12 can additionally function to move the optical sensor's field of view within the physical space. For example, the aerial vehicle 12 can control macro movements (e.g., large FOV changes, on the order of meter adjustments), micro movements (e.g., small FOV changes, on the order of millimeter or centimeter adjustments), or any other suitable movement.

The aerial vehicle 12 can perform certain functionality based on onboard processing of sensor data from onboard sensors. This functionality may include, but is not limited to:

Take-off and landing;
Owner recognition;
Facial recognition;
Speech recognition;

Facial expression and gesture recognition; and,

Control, e.g., motion, of the aerial system based on owner, facial, expression and gesture recognition, and speech recognition.

In the illustrated embodiment, the aerial vehicle 12 includes a fuselage body 20, a processing system 22, a communication system 24, an optical system 26, and an actuation mechanism 28 mounting the optical system 26 to the body 20. The aerial vehicle 12 can additionally or alternatively include one or more optical sensors 36, power supply 38, lift mechanisms 40, additional sensors 44, or any other suitable component (see below).

The body 20 of the aerial vehicle 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material.

In the illustrated embodiment, three mutually perpendicular axes 46, 48, and 50 extend through the aerial vehicle 12, and are used to define a three-dimensional Cartesian coordinate system relative to aerial vehicle 12. For example, the fuselage body 20 can define a longitudinal axis 46, a lateral axis 48, and a transverse axis 50. The longitudinal axis 46 extends lengthwise along the fuselage body 20, the lateral axis 48 extends widthwise along the fuselage body 20 and is orientated perpendicular to the longitudinal axis 46, and the transverse axis 50 is orientated perpendicular to the longitudinal axis 46 and to the lateral axis 48. The fuselage body 20 may include a plurality of sidewalls 52 that extend between a front end 54 and an opposite back end 56 (e.g., opposing the front end along the longitudinal axis 46), and between a top portion 58 and an opposite bottom portion 60 (e.g., opposing the top along the transverse axis 50). In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured and may define any other suitable reference system.

The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial vehicle 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial vehicle 12 functions to control aerial system operation. The processing system 22 can: stabilize the aerial vehicle 12 during flight (e.g., in an embodiment in which coaxial rotors are used, control the rotors to minimize aerial system wobble in-flight); receive, interpret, and operate the aerial vehicle 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial vehicle 12 and mounted to the body 20 but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial vehicle 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial vehicle 12 functions to send and/or receive information from the remote device 14. The communication system 24 is preferably connected to the processing system 22, such that the communication system 24 sends and/or receives data form the processing system 22 but can alternatively be connected to any other suitable component. The aerial vehicle 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial vehicle 12 functions to record images of the physical space proximal the aerial vehicle 12. The optical system 26 is preferably mounted to the body 20 via the actuation mechanism 28 but can alternatively be statically mounted to the body 20, removably mounted to the body 20, or otherwise mounted to the body 20. The optical system 26 is preferably mounted to the bottom end of the body 20, but can optionally be mounted to the front, top, back end, or any other suitable portion of the body 20. The optical system 26 is preferably connected to the processing system 22 but can alternatively be connected to the communication system 24 or to any other suitable system. The optical system 26 can additionally include dedicated image processing hardware that automatically processes images recorded by the camera prior to transmission to the processor or other endpoint. The aerial vehicle 12 can include one or more optical systems 26 of same or different type, mounted to the same or different position. In one variation, the aerial vehicle 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

The optical system 26 can include one or more optical sensors 36. The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial vehicle 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or supply 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial vehicle 12 functions to power the active components of the aerial vehicle 12. The power supply 38 is preferably mounted to the body 20, and electrically connected to all active components of the aerial vehicle 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial vehicle 12 functions to enable aerial system flight. The lift mechanism 40 preferably includes a set propeller rotor blades driven by one or more motors but can alternatively include any other suitable propulsion mechanism. The lift mechanism 40 is preferably mounted to the body 20 and controlled by the processing system 22 but can alternatively be otherwise mounted to the aerial vehicle 12 and/or controlled. The aerial vehicle 12 can include multiple lift mechanisms 40. In one example, the aerial vehicle 12 includes four lift mechanisms 40 (e.g., two pairs of lift mechanisms 40), wherein the lift mechanisms 40 are substantially evenly distributed about the perimeter of the aerial vehicle 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial vehicle 12 (e.g., the physical space proximal the aerial vehicle 12), or any other suitable parameter. The sensors 44 are preferably mounted to the body 20 and controlled by the processing system 22 but can alternatively be mounted to any other suitable component and/or otherwise controlled. The aerial vehicle 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial vehicle 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial vehicle 12 can additionally include inputs (e.g., microphones, cameras, etc.), outputs (e.g., displays, speakers, light emitting elements, etc.), or any other suitable component.

The aerial vehicle 12 can optionally be used with a remote computing system, or with any other suitable system. The aerial vehicle 12 functions to fly, and can additionally function to take photographs, deliver loads, and/or relay wireless communications. The aerial vehicle 12 is preferably a rotorcraft (e.g., hopter, quadcopter, helicopter, cyclocopter, etc.), but can alternatively be a fixed-wing aircraft, aerostat, or be any other suitable aerial vehicle 12.

The remote computing system may be a remote device 14 that functions to receive auxiliary user inputs and can additionally function to automatically generate control instructions for and send the control instructions to one or more aerial systems 12. Each aerial vehicle 12 can be controlled by one or more remote computing systems (e.g., one or more remote devices 14). The remote computing system preferably controls the aerial vehicle 12 through a client (e.g., a native application, browser application, etc.), but can otherwise control the aerial vehicle 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. In some embodiments, control of the aerial vehicle 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial vehicle 12.

In at least one embodiment, the aerial vehicle 12 may be controlled without physical interaction with the remote device 14, however, a display of the remote device 14 may be used to display images and/or video relayed from the aerial vehicle 12 which may aid the user 18 in controlling the aerial vehicle 12. In addition, sensors 36, 44 associated with the remote device 14, e.g. camera(s) and/or a microphone (not show) may relay data to the aerial vehicle 12, e.g. when the aerial vehicle 12 is too far away from the user 18. The sensor data relayed from the remote device 14 to the aerial vehicle 12 is used in the same manner as the sensor data from the on-board sensors 36, 44 are used to control the aerial vehicle 12 using user expression.

In this manner, the aerial vehicle 12 may be fully controlled, from start to finish, either (1) without utilization of a remote device 14, or (2) without physical interaction with the remote device 14. Control of the aerial vehicle 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial vehicle 12 during flight and other features, such as triggering of photo and/or video capturing. As discussed above, the aerial vehicle 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial vehicle 12 includes an optical system 26 that includes one or more optical sensor 36, such as a camera. The at least one on-board camera is configured for live video streaming and computer vision analysis. Optionally the aerial vehicle 12 can have at least one depth sensor (or stereo-vision pair) for multi-pixel depth sensing. Optionally the aerial vehicle 12 can have at least one microphone on board for voice recognition and control.

In general, in order to provide full control of the aerial vehicle 12, a plurality of user/drone interactions or activities from start to end of an aerial session are provided. The user/drone interactions include, but are not limited to take-off and landing, owner recognition gesture recognition, facial expression recognition, and voice control.

Foldable Propeller Assembly

With reference to FIGS. 3-10, in the illustrated embodiment, each lift mechanism 40 includes a rotor blade assembly 62 that is coupled to a rotary driving member 64. The rotary driving member 64 includes motor 66 and a rotating motor shaft 68 that is coupled to the motor 66 and defines an axis of rotation 70. The rotor blade assembly 62 is coupled to the motor shaft 68 such that the rotation of the motor shaft 68 causes a rotation of the rotor blade assembly 62 about the axis of rotation 70. The rotor blade assembly 62 includes a rotor blade attachment mechanism 72 and a plurality of rotor blades 74, e.g. propellers, that are coupled to the rotor blade attachment mechanism 72. The rotor blade attachment mechanism 72 is coupled to the motor shaft 68 to support the plurality of rotor blades 74 from the rotary driving member 64. In the illustrated embodiment, the rotor blade assembly 62 includes two propeller rotor blades 74. However, it should be noted that the rotor blade assembly 62 may include any number of rotor blades 74.

Figure 5A:
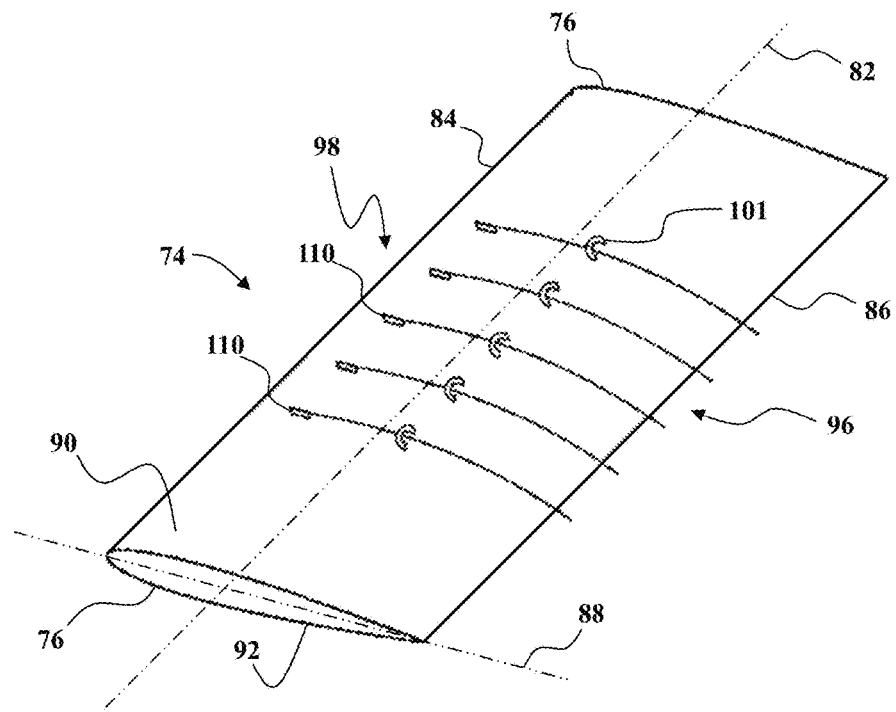
FIG. 5A is a perspective view of a middle portion of the rotor blade assembly shown in FIG. 4.

In the illustrated embodiment, each rotor blade 74 includes a middle portion 76. Each rotor blade 74 has an associated longitudinal axis 82 that extends between a root portion 78 and an opposing tip portion 80 and a chordwise axis that extends between a leading edge 84 and a trailing edge 86. The root portion 78 is adapted to facilitate mounting the rotor blade 74 to the rotor blade attachment mechanism 72. Each rotor blade 74 includes a first blade section 90, such as a suction side blade section, and an opposing second blade section 92, such as a pressure side blade section. The first blade section 90 is coupled to second blade section 92 along the leading edge 84 and the axially spaced trailing edge 86. Each rotor blade 74 includes an inboard portion 94 and an outboard portion 96 extending outwardly from the inboard portion 94 along the spanwise axis 82. At the inboard portion 94, the rotor blade 74 has a cross-sectional shape that is configured to facilitate coupling the rotor blade 74 to the rotor blade attachment mechanism 72. At the outboard portion 96, the rotor blade 74 has a substantially airfoil cross-sectional shape (as shown in FIG. 5A) extending from a transition point adjacent the inboard portion 94 toward the tip portion 80.

Figure 5B:
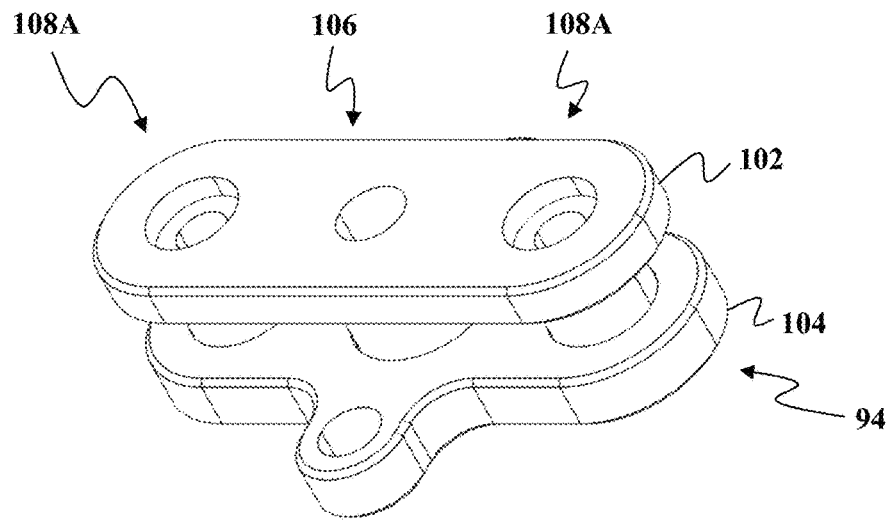
FIG. 5B is a perspective view of a rotor blade attachment mechanism of the rotor blade assembly of FIG. 4.
Figure 5C:
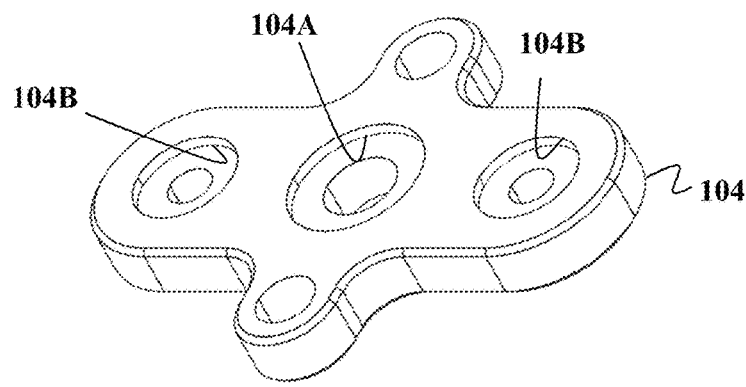
FIG. 5C is a perspective view of a bottom portion of the rotor blade attachment mechanism of FIG. 5B.
Figure 5D:
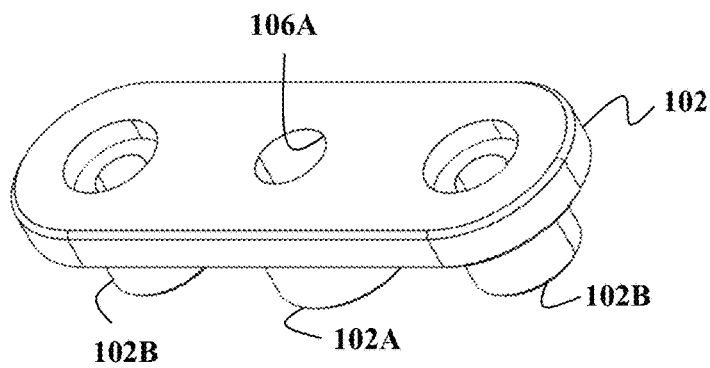
FIG. 5D is a perspective view of an upper portion of the rotor blade attachment mechanism of FIG. 5B.
Figure 6A:
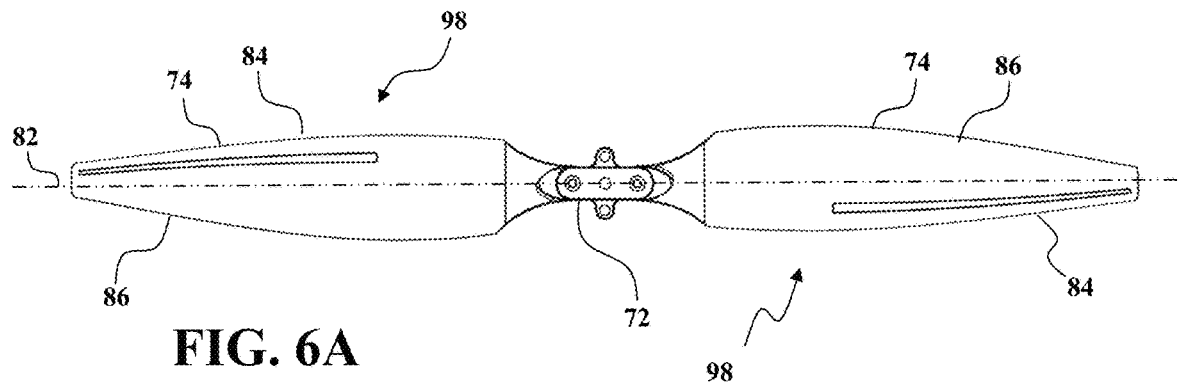
FIG. 6A is a top view of the rotor blade assembly of FIG. 4 including miniature vortex generators, according to a first embodiment of the present invention.
Figure 6B:
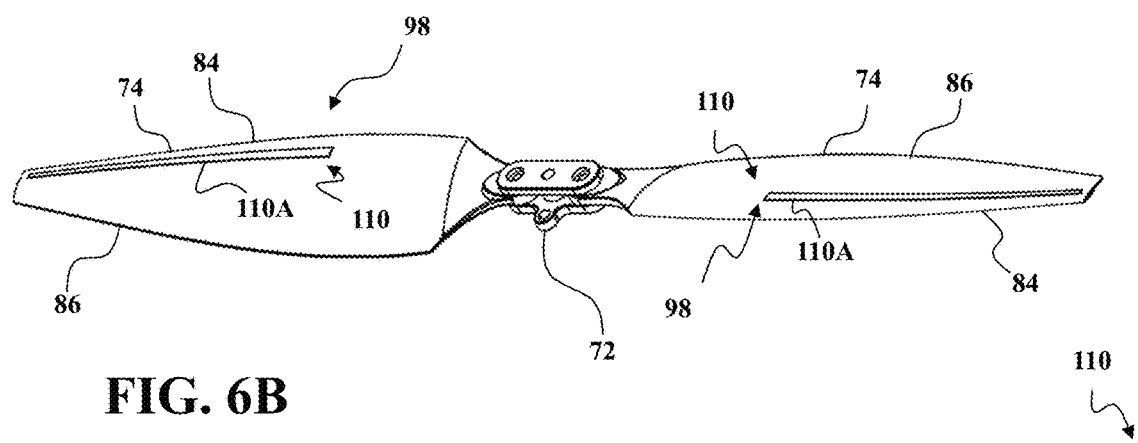
FIG. 6B is a perspective view of the rotor blade assembly of FIG. 6A.
Figure 6C:
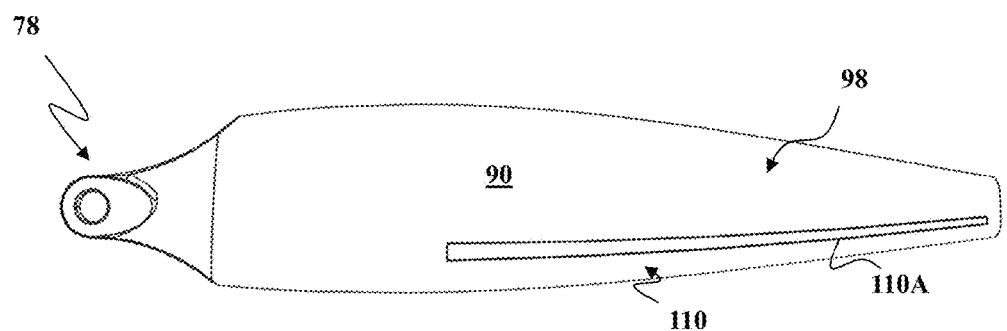
FIGS. 6C-6E are perspective views of a rotor blade of the rotor blade assembly of FIG. 6A.
Figure 6D:
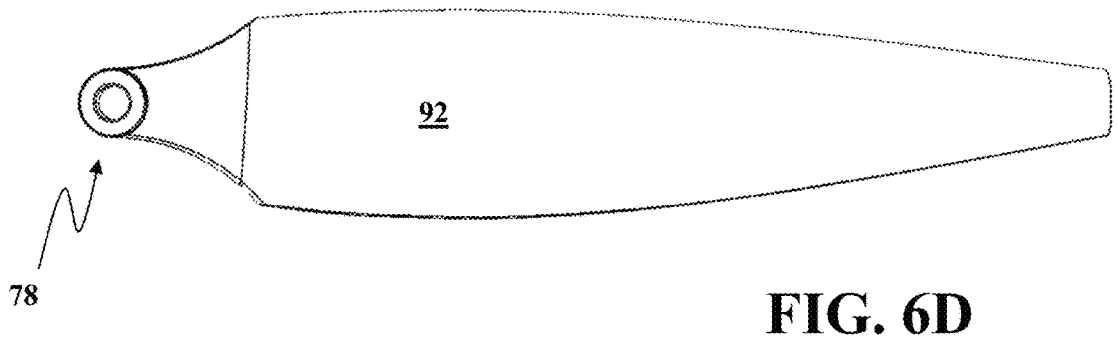
Figure 6E:
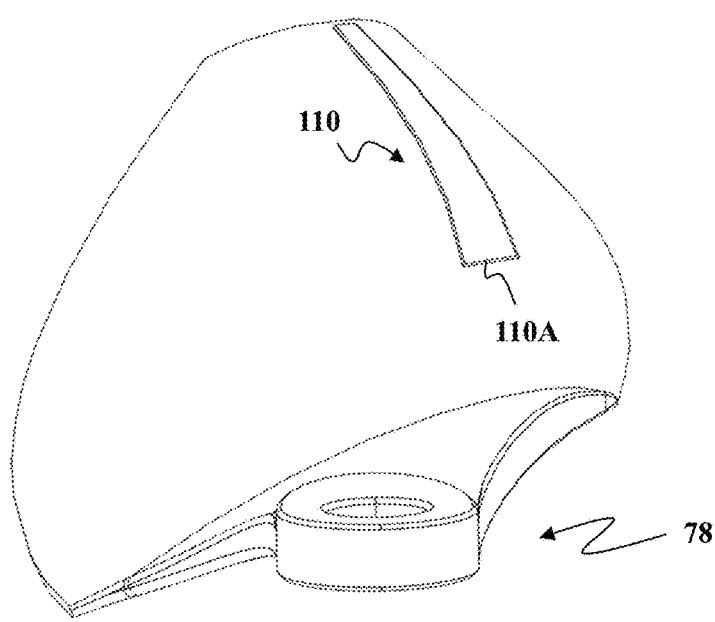
Figure 6F:
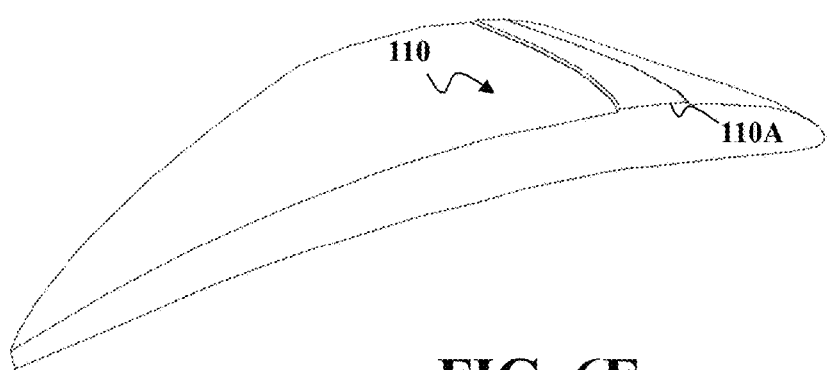
FIG. 6F is a cut-away view of the rotor blade of FIGS. 6C-6E.
Figure 7A:
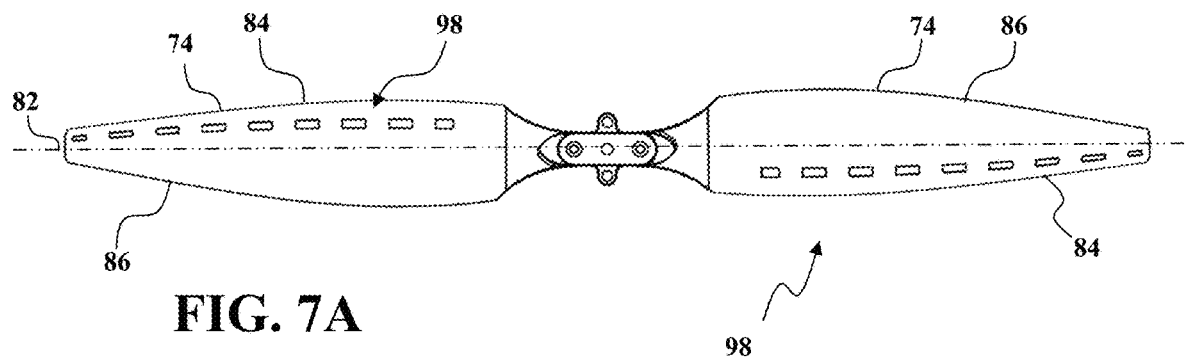
FIG. 7A is a top view of the rotor blade assembly of FIG. 4 including miniature vortex generators, according to a second embodiment of the present invention.
Figure 7B:
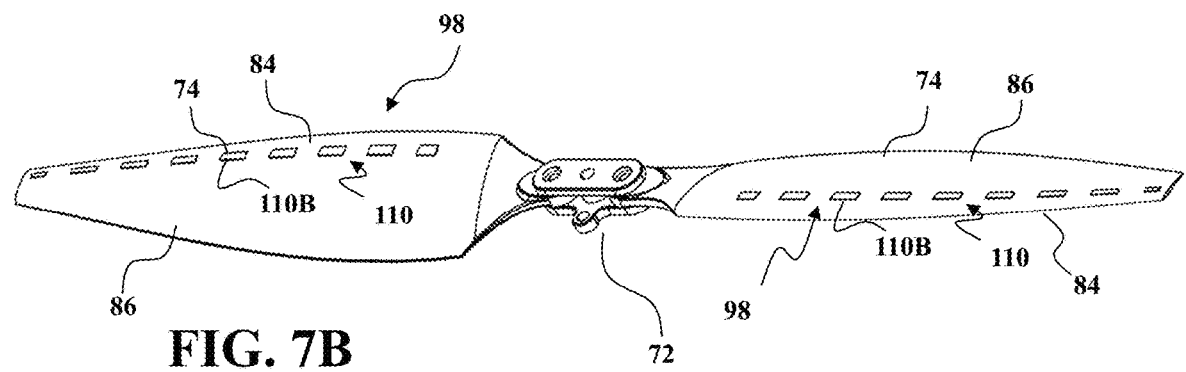
FIG. 7B is a perspective view of the rotor blade assembly of FIG. 7A.
Figure 7C:
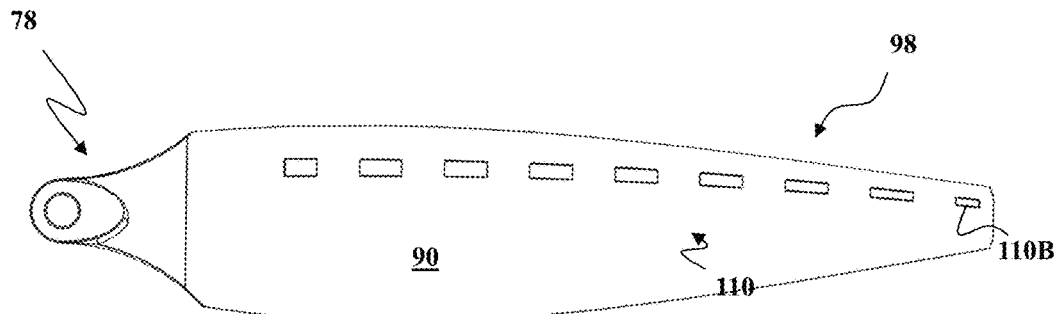
FIGS. 7C-7E are perspective views of a rotor blade of the rotor blade assembly of FIG. 7A.
Figure 7D:
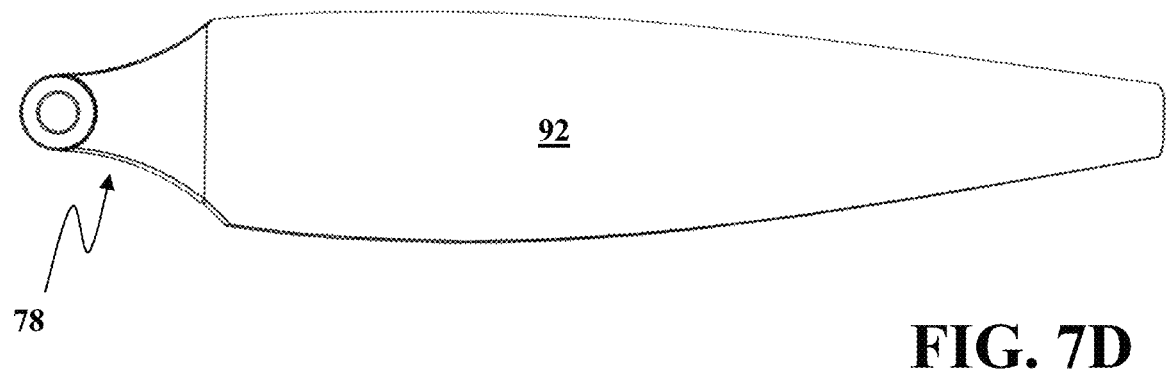
Figure 7E:
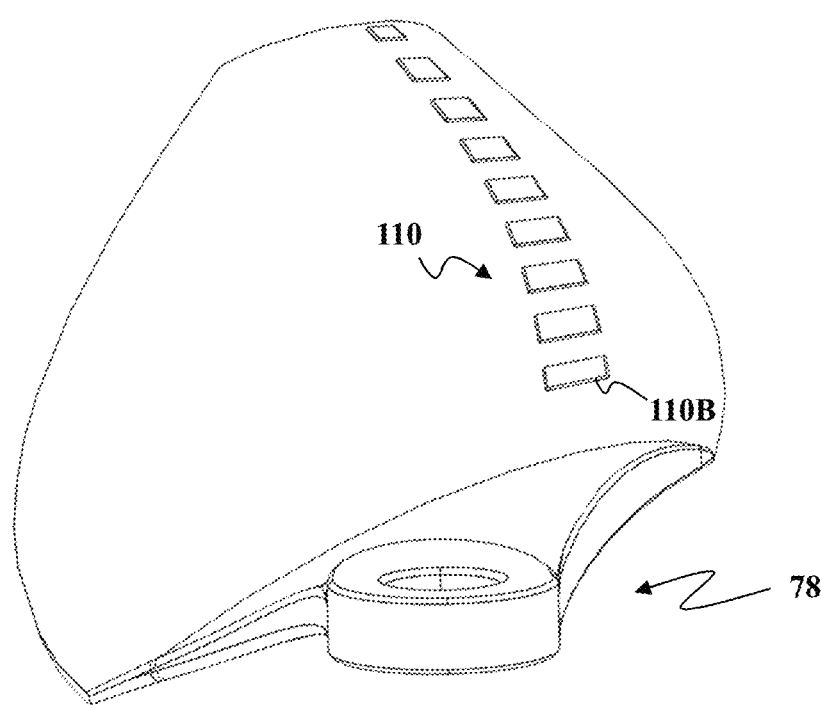
Figure 7F:
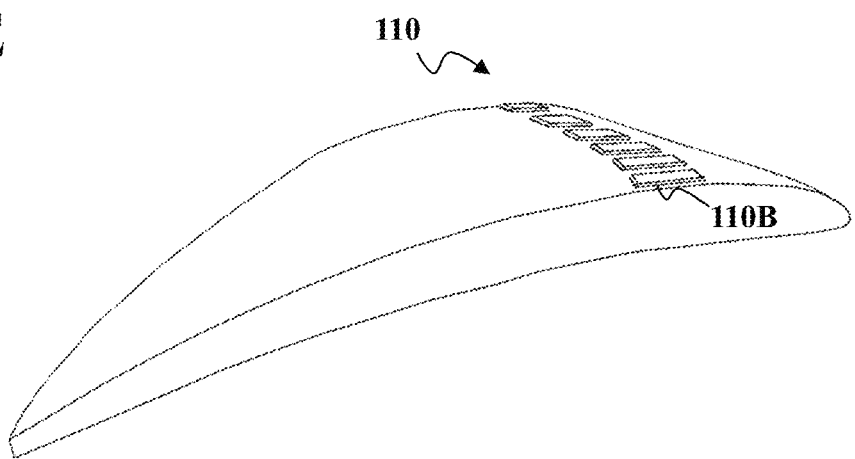
FIG. 7F is a cut-away view of the rotor blade of FIGS. 7C-7E.
Figure 8A:
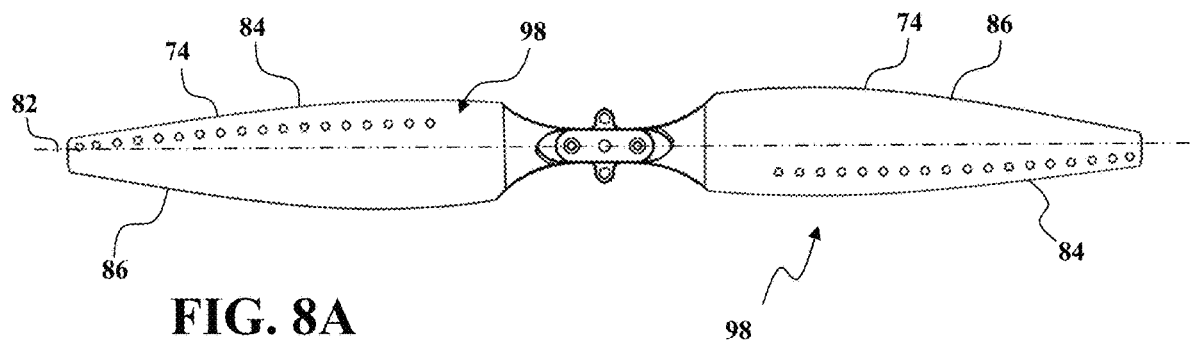
FIG. 8A is a top view of the rotor blade assembly of FIG. 4 including miniature vortex generators, according to a third embodiment of the present invention.
Figure 8B:
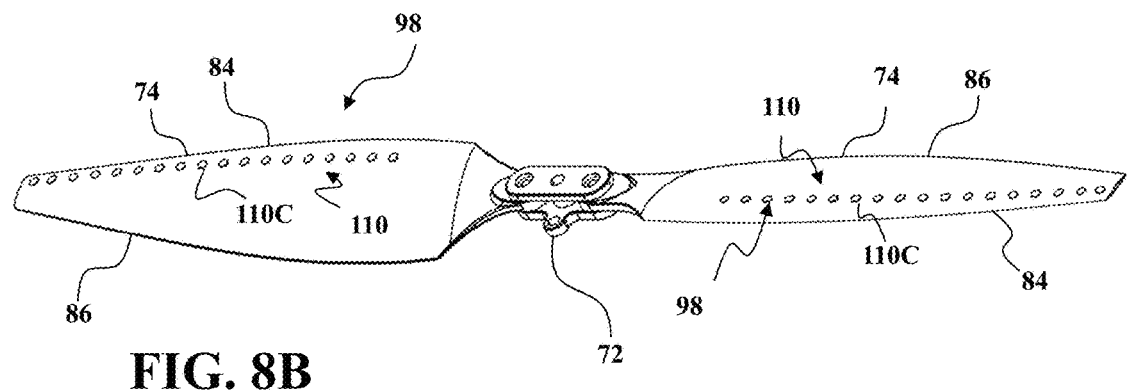
FIG. 8B is a perspective view of the rotor blade assembly of FIG. 8A.
Figure 8C:
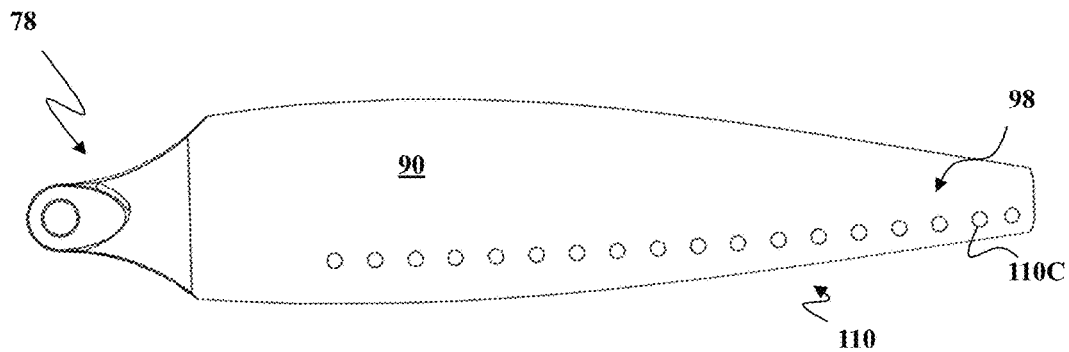
FIGS. 8C-8E are perspective views of a rotor blade of the rotor blade assembly of FIG. 8A.
Figure 8D:
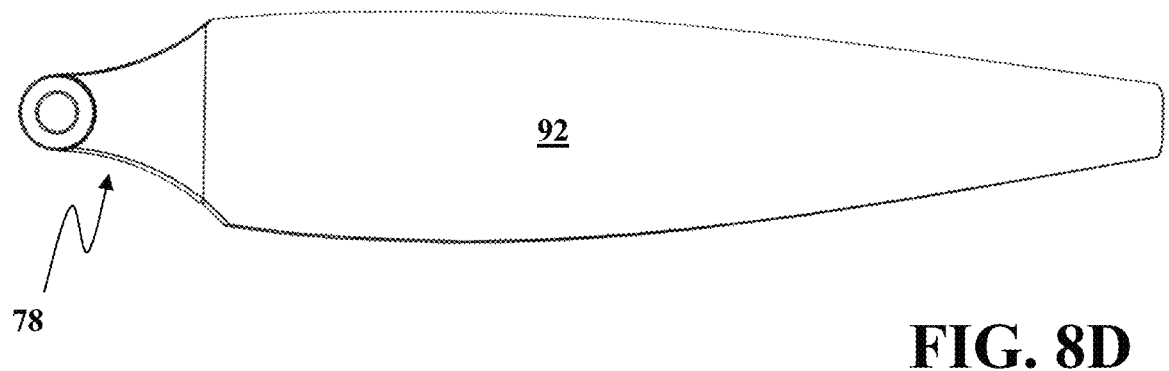
Figure 8E:
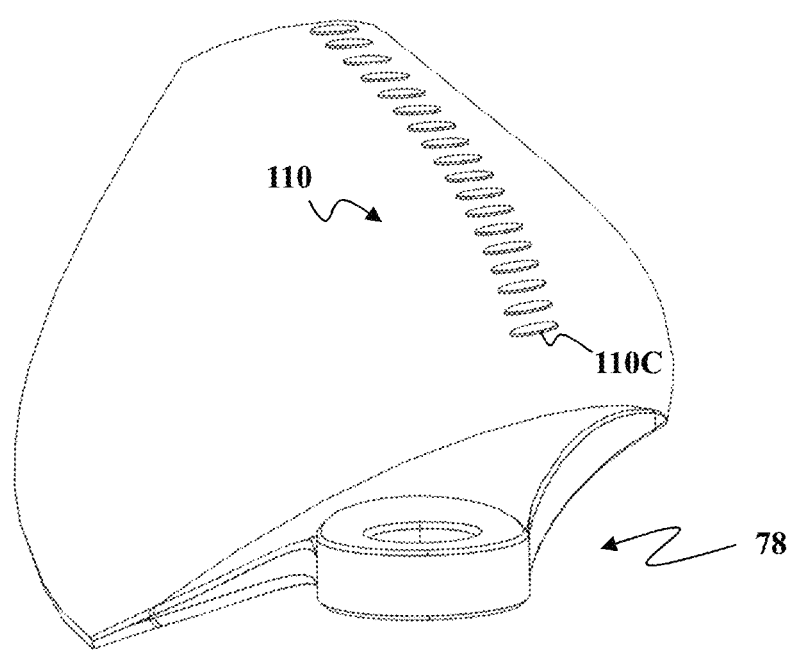
Figure 8F:
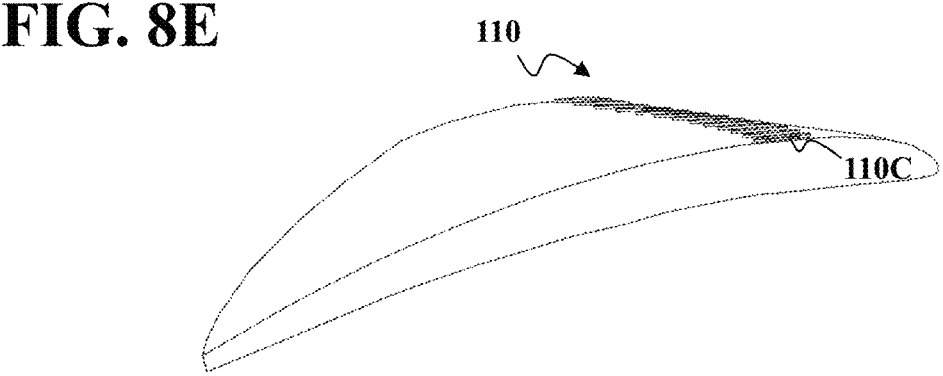
FIG. 8F is a cut-away view of the rotor blade of FIGS. 8C-8E.
Figure 9A:
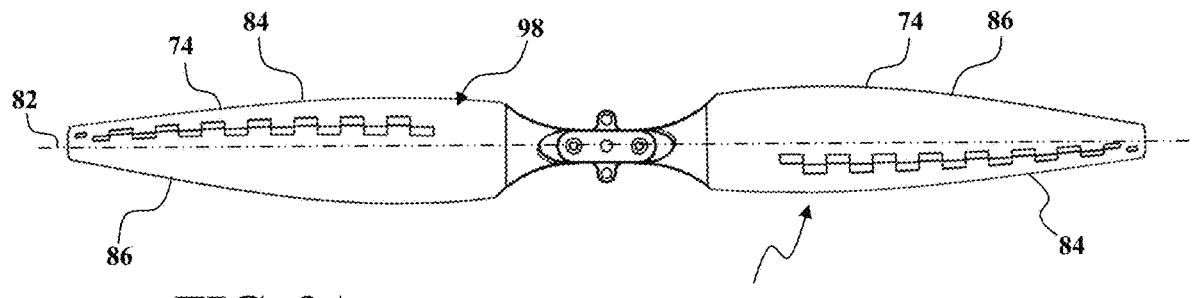
FIG. 9A is a top view of the rotor blade assembly of FIG. 4 including miniature vortex generators, according to a fourth embodiment of the present invention.
Figure 9B:
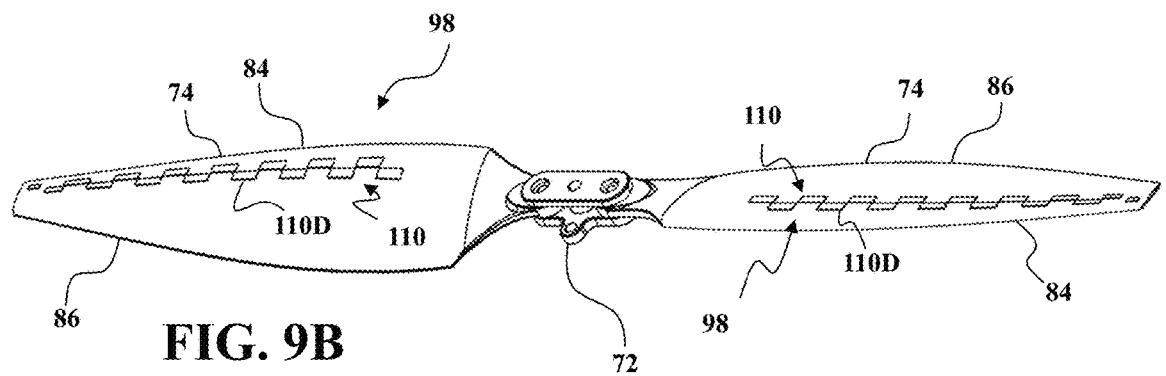
FIG. 9B is a perspective view of the rotor blade assembly of FIG. 9A.
Figure 9C:
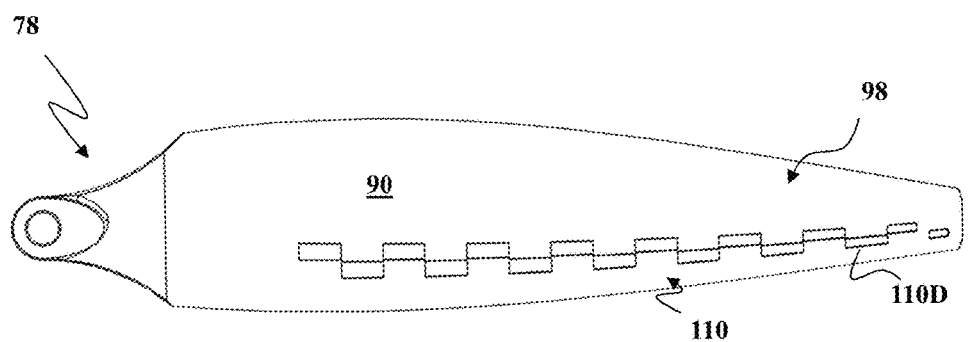
FIGS. 9C-9E are perspective views of a rotor blade of the rotor blade assembly of FIG. 9A.
Figure 9D:
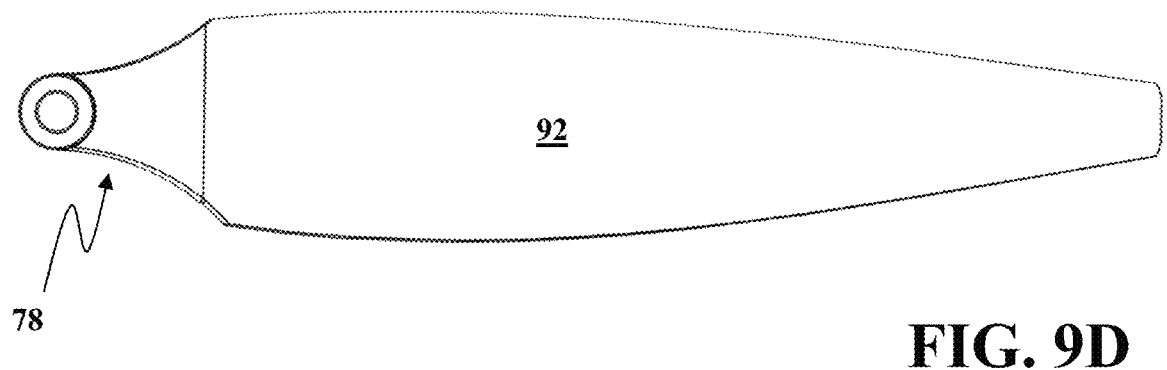
Figure 9E:
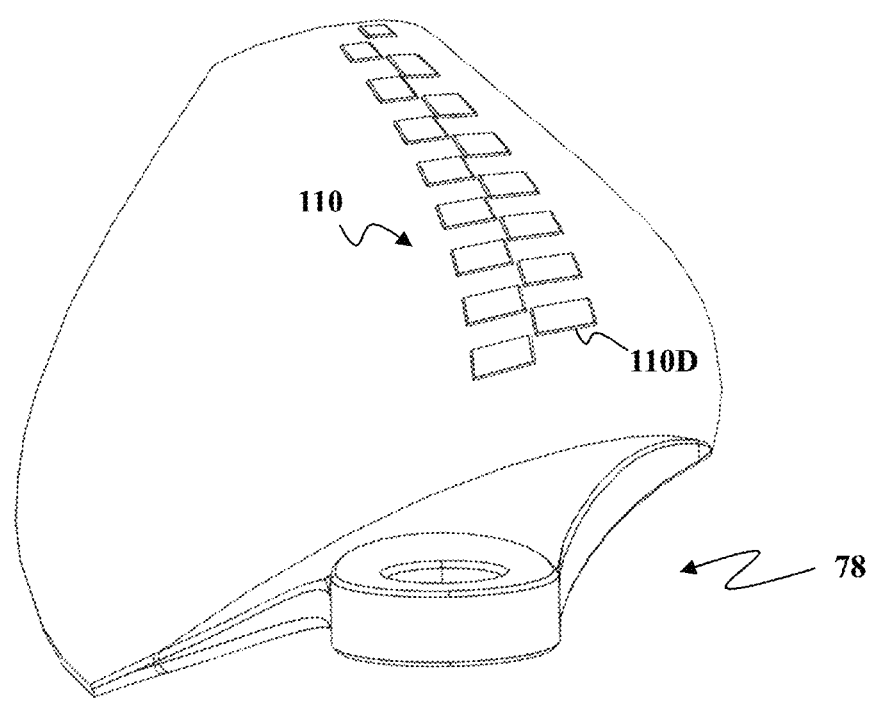
Figure 9F:
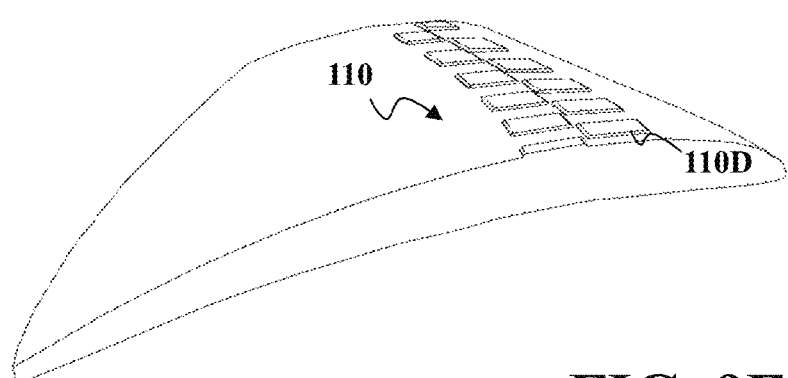
FIG. 9F is a cut-away view of the rotor blade of FIGS. 9C-9E.

With reference to FIGS. 5B-5C, in one embodiment the rotor blade attachment mechanism 74 includes an upper portion 102 and a lower portion 104. As discussed below, the upper and lower portions 102, 104 are configured to positioned on either side of a portion of the rotor blades 74. The rotor blade attachment mechanism 74 includes a center aperture 106 that is mounted to the motor shaft 68. The upper portion 102 includes a central post 102A. The center aperture 106 is formed by an upper portion 102 formed through the central post 102A. An end of the central post 102A fits within a central flange 104A in an upper surface of the lower portion 104. First and second side posts 102B fit within respective first and second side flanges 104B in the upper surface of the lower portion 104. The upper and lower portions 102, 104 of the rotor blade attachment mechanism 74 are connected and fastened together using fasteners (not shown).

In the illustrated embodiment, each rotor blade 74 includes a miniature vortex generator 98 defined along an upper surface of the rotor blade 74. The miniature vortex generator 98 enhances propeller efficiency and reduces propeller noise of the rotor blade 74 (see below).

The desired effect is achieved by setting protrusions or depressions at specific positions on the surface of the rotor blade 74. In the illustrated embodiment each miniature vortex generator 98 is comprised of a single generator portion, generally referred by reference number 110. Each generator portion 110 may be either a protrusion or a depression which are unitarily formed with the respective rotor blade 74. For instance, the rotor blades 74 and respective miniature vortex generator 98 may be formed by the same injection molding process. For example, the rotor blades 74 and respective miniature vortex generator 98 may be comprised from a plastic and unitarily formed using a plastic injection molding process.

For example, as shown in FIGS. 5A, 6A-6F, 7A-7F, 8A-8F, 9A-9F, and 10A-10I, in some embodiments, the rotor blade 74 includes a plurality of vortex generators 98 that are defined along an upper surface of the first blade section 90 and are spaced along the spanwise axis 82. In the illustrated embodiments, the miniature vortex generator 98 are unitarily formed with the respective rotor blade 74. For example, the rotor blades 74 and the miniature vortex generator 98 (as protrusion(s) or depression(s)) may be formed using a plastic injection molding process.

The vortex generators 98 may be positioned closer to the leading edge 84 than the trailing edge 86. The vortex generators 98 may be orientated along the spanwise axis 82 in a single row 100 of vortex generators 98 (see for example, FIGS. 8A-8F). In other embodiments, the vortex generators 98 may be orientated along the spanwise axis 82 in a plurality of rows 100 of vortex generators 98 (see for example, FIGS. 9A-9F). In addition, as shown in FIGS. 9A-9F, each row 100 of vortex generators 98 may be offset from adjacent rows 100 along the spanwise axis 82. In one embodiment, as shown in FIGS. 6A-6F, the rotor blade 74 may include a single vortex generator 98 that extends along the upper surface of the rotor blade 74 from the tip portion 80 towards to the root portion 78.

In some embodiments, as shown in FIGS. 5A, 6A-6F, 7A-7F, 8A-8F, 9A-9F, a vortex generator 98 may extend outwardly from the upper surface of the rotor blade 74. As discussed below, each vortex generator may be comprised one of more generator portions 110 which may be recessed or protrude from the upper surface of the rotor blade 74.

In the illustrated embodiment, an aerial vehicle or unmanned aerial vehicle 12 includes a fuselage body 20 and a lift mechanism 40 coupled to the fuselage body 20. The lift mechanism 40 includes a rotor blade assembly 62 and a rotary driving member 64 which defines an axis of rotation 70. The rotary driving member 64 controllably rotates the rotor blade assembly 62 about the axis of rotation 70 (see above). The rotor blade assembly 62 includes at least one rotor blade or propeller) 74. The at least one rotor blade 74 includes a vortex generator 94 defined along an upper surface of the rotor blade 74.

In one embodiment of the present invention, the at least one rotor blade 74 and the vortex generator 98 are unitarily formed, e.g., using an injection molding process. For example, the rotor blade 74 may be composed from a plastic and the rotor blades 74 and the vortex generators 98 formed unitarily using a plastic injection molding process. In another embodiment, the rotor blade 74 may be formed first and the vortex generator 98 formed thereafter. For example, the rotor blade 74 may be formed using an injection molding process and the vortex generator 98 formed thereafter, via a machining process or a by adding on the vortex generator 98 thereon using, for example, an adhesive.

Each vortex generator 98 includes one or more generator portions 110. As detailed in more depth below, each generator portion 110 may be formed as one of a depression and protrusion.

As detailed above, in the illustrated embodiment, the rotor blade assembly 96 includes a rotor blade attachment mechanism 72. Each of the at least one rotor blade 74 includes has an associated longitudinal spanwise axis 82 that extends between a root portion 78 and an opposing tip portion 80 of the rotor blade 74 and an associated chordwise axis 88 that extends between a leading edge 84 and a trailing edge 86 of the rotor blade 74. The at least one rotor blade 74 is mounted to the rotor blade attachment mechanism 72 at the root portion 78.

As shown in FIG. 5, the generator portions 110 may be oriented along, i.e., parallel to, the spanwise axis 82. In one embodiment, the vortex generator 98 includes a plurality of generator portions 110 arranged in a plurality of rows. One of the rows is oriented along the spanwise axis and another one of the rows is offset from the spanwise axis (see below). Further, the generator portions 110 may be of any suitable shape, for example, the generator portions 110 may have a rectangular or circular shape.

With reference to FIGS. 6A-6F, in one embodiment the vortex generator 98 includes a single unitary portion or generator portion 110A that extends along, i.e., is parallel to, the spanwise axis 82. As shown in the cutaway view of FIG. 6F, in the illustrated embodiment, the generator portion 110A protrudes from the surface of the rotor blade 74. However, as noted above, the generator portion 110A could also be a depression. Further in the illustrated embodiment, the single unitary portion 110A extends along, i.e., is parallel to, the spanwise axis 82.

With reference to FIGS. 7A-7F, in one embodiment the vortex generator 98 includes a plurality of generator portion 110B have a rectangular shape. In the illustrated embodiment the generator portions 110B are in a single row that extends along, i.e., is parallel to, the spanwise axis 82. As shown in the cutaway view of FIG. 7F, in the illustrated embodiment, the generator portions 110 protrude from the surface of the rotor blade 74. However, as noted above, the generator portions 110C could also be depressions.

With reference to FIGS. 7A-7F, in one embodiment the vortex generator 98 includes a plurality of generator portion 110B have a rectangular shape. In the illustrated embodiment the generator portions 110B are in a single row that extends along, i.e., is parallel to, the spanwise axis 82. As shown in the cutaway view of FIG. 7F, in the illustrated embodiment, the generator portions 110 protrude from the surface of the rotor blade 74. However, as noted above, the generator portions 110B could also be depressions.

With reference to FIGS. 8A-8F, in one embodiment the vortex generator 98 includes a plurality of generator portion 110C have a circular shape. In the illustrated embodiment the generator portions 110C are in a single row that extends along, i.e., is parallel to, the spanwise axis 82. As shown in the cutaway view of FIG. 8F, in the illustrated embodiment, the generator portions 110 protrude from the surface of the rotor blade 74. However, as noted above, the generator portions 110C could also be depressions.

While the embodiments in FIGS. 7A-7F and 8A-8F include rectangular and circular shaped generator portions 110, it should be noted that any suitable shape may be used.

With reference to FIGS. 9A-9F, in one embodiment the vortex generator 98 includes a plurality of generator portions 110D have a rectangular shape. In the illustrated embodiment the generator portions 110D are arranged in two rows. One of the rows extends along, i.e., is parallel to, the spanwise axis 82. The other row is offset from the first row. As shown in the cutaway view of FIG. 9F, in the illustrated embodiment, the generator portions 110D protrude from the surface of the rotor blade 74. However, as noted above, the generator portions 110D could also be depressions.

Figure 10A:
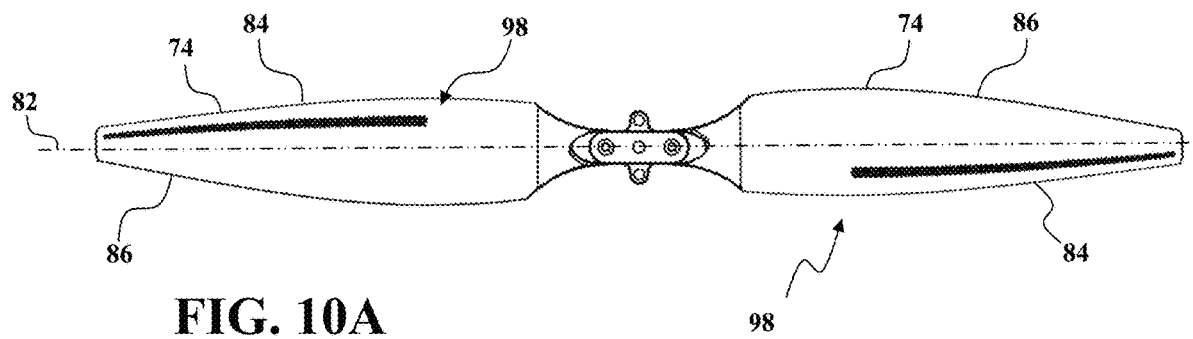
FIG. 10A is a top view of the rotor blade assembly of FIG. 4 including miniature vortex generators, according to a fifth embodiment of the present invention.
Figure 10B:
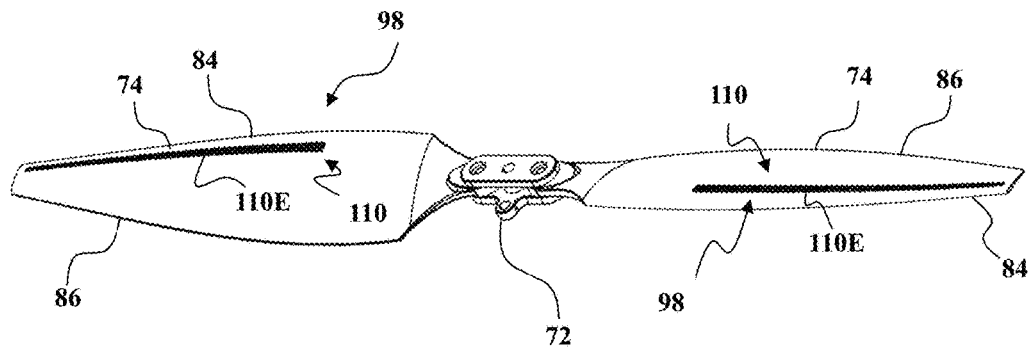
FIG. 10B is a perspective view of the rotor blade assembly of FIG. 10A.
Figure 10C:
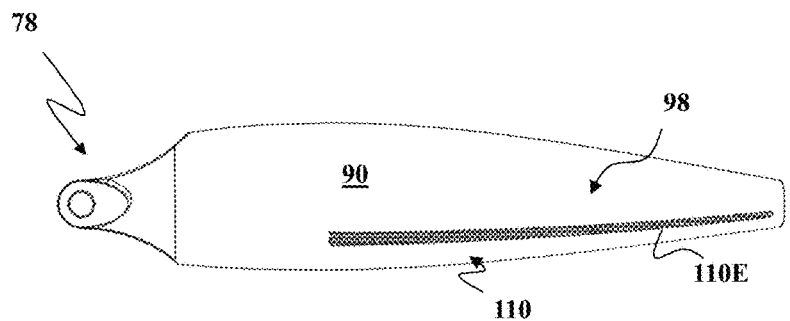
FIGS. 10C-10D are perspective views of a rotor blade of the rotor blade assembly of FIG
Figure 10D:
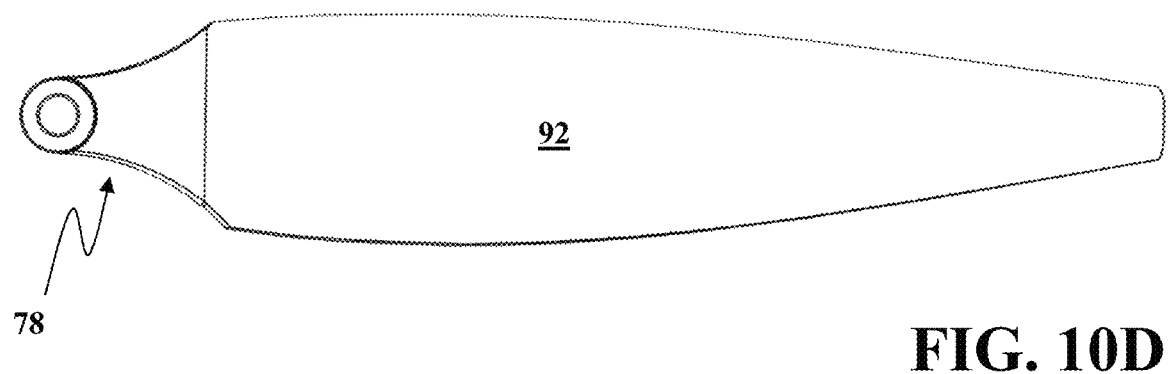
Figure 10E:
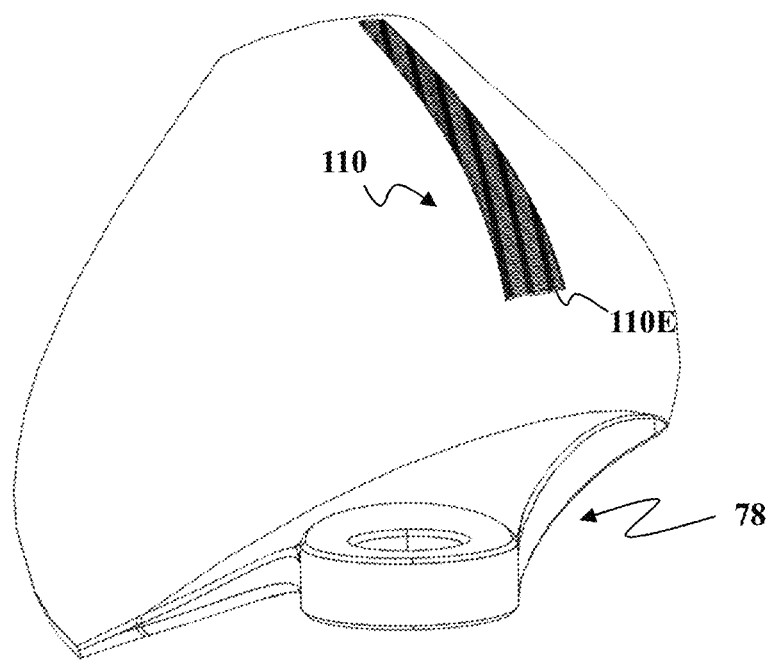
FIGS. 10E-10I are view of a pattern of generator portions of a vortex generator on a surface of the rotor blade of the rotor blade assembly of FIG. 10A.
Figure 10F:
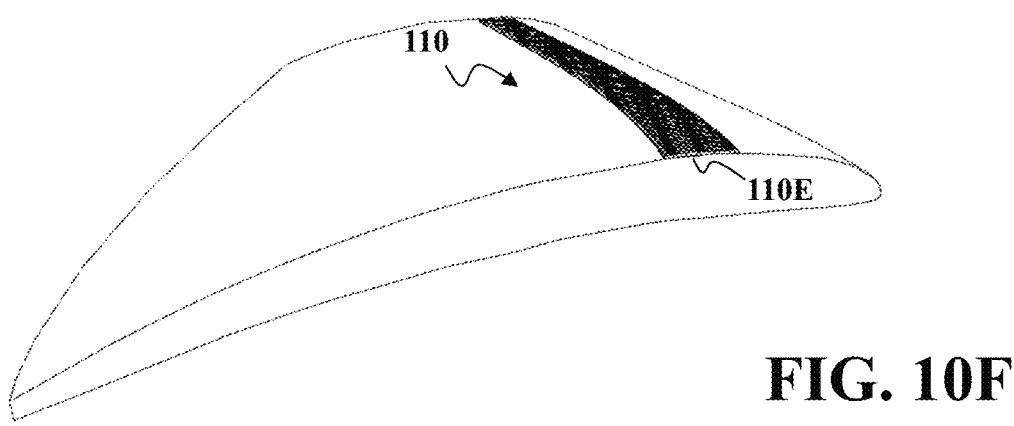
Figure 10G:
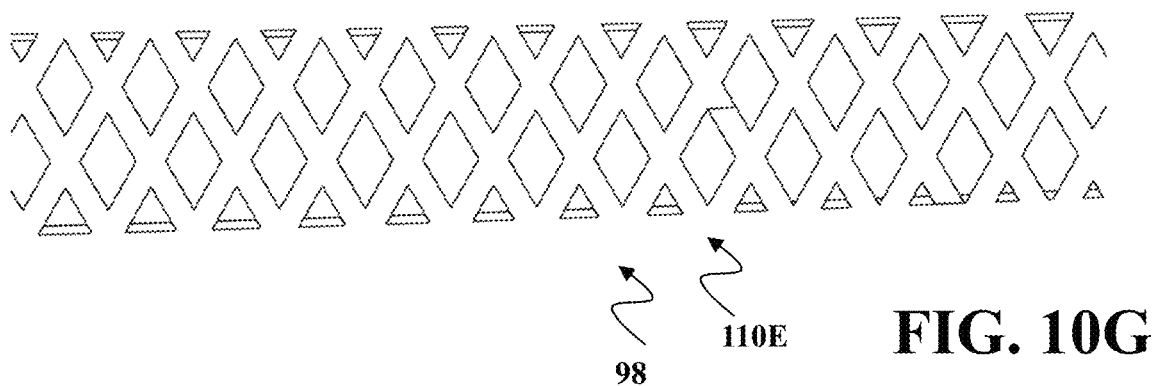
Figure 10H:
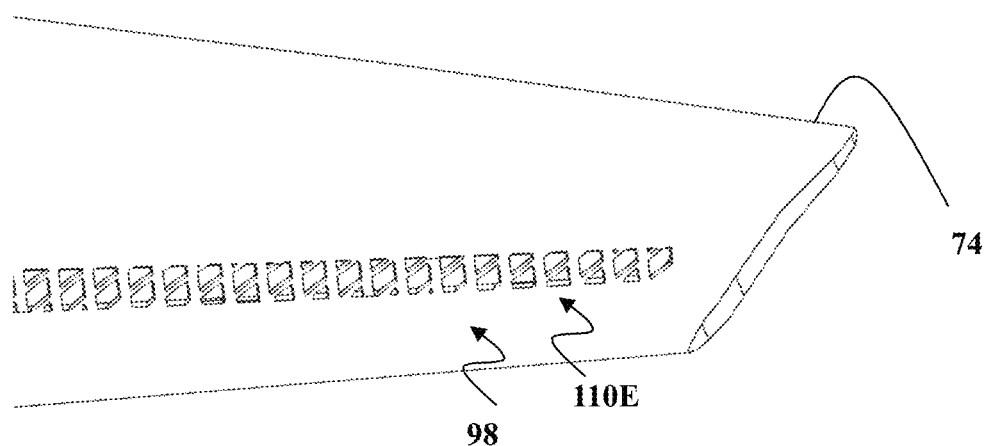
Figure 10I:
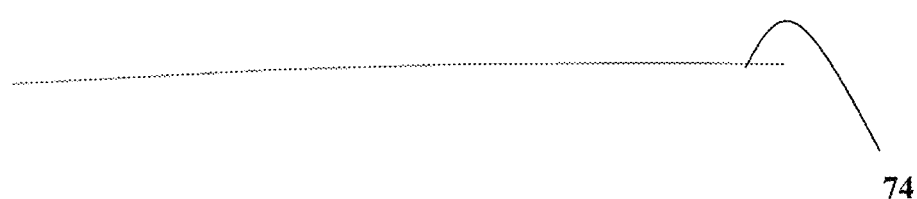

With reference to FIGS. 10A-10F, in one embodiment the vortex generator 98 includes a plurality of generator portions 110E having different shapes. As shown, the generator portions 110 are in multiple rows, one or more of which may not extend the full length of the vortex generator. As shown in the cutaway view of FIG. 10F, in the illustrated embodiment, the generator portions 110E protrude from the surface of the rotor blade 74 or a "tread-like" pattern. In the illustrated embodiment the generator portions 110B are in a single row that extends along, i.e., is parallel to, the spanwise axis 82. As shown in the cutaway view of FIG. 7F, in the illustrated embodiment, the generator portions 110 protrude from the surface of the rotor blade 74. However, as noted above, the generator portions 110C could also be depressions. FIG. 10G is an enlarged portion of a middle part of the vortex generator 98 (shown in FIG. 10I). FIG. 10H is a view of end part of the vortex generator 98 (near the end of the rotor blade.

As noted above, the generator portions 110 may be also be a roughened surface in the rotor blade 74.

Each rotor blade 74 has a chord length defined by a distance along the chordwise axis between the leading edge 84 and the trailing edge 86. In one embodiment, the height or depth of each generator portion 100 is between 0.2% and 5% of the chord length.

Motivation and Intention

When the rotor blade (or rotorcraft propeller) 74 is used, the higher efficiency will lead to longer cruise duration under the same power. For most of the multi-rotor aircrafts, cruise duration is always a major weak point due to various restrictions such as load. It is increasingly important to design a more efficient propeller under demand. For a completed propeller design, it would be beneficial if any modification can be applied to it to further improve its efficiency.

At the same time, the consumer-grade UAV will usually interact with people during the use, it is hoped that the noise of the aircraft will be as low as possible. The main cause of the noise of the multi-rotor aircraft is the propeller rotation noise. Reducing propeller noise will be the primary method to reduce drone noise.

During the design and test of the rotor blade 74, with continuous experiments, a solution is found which can greatly improve the efficiency of the propeller and reduce the propeller noise.

In order to avoid severe flow separation at a specific rotational speed of the blade, it is now possible to reduce the noise and increase efficiency by setting a form of protrusion or depression prior to the flow separation point. The protrusions or depressions are generally arranged on the upper surface of the rotor blade 74, and are set according to the actual conditions of different propellers, generally the position will locate in the middle leading edge, and for some special propeller the position may also be arranged at the rear edge of the middle. The forms of the protrusions or depressions are diversified and can be strips, dots, regular graphics or irregular graphics.

Technical Implementation

During the flow of air in the boundary layer along the surface of the rotor blade 74, its speed is reduced by the influence of friction, and on the other hand by the pressure change along the way. In the suitable pressure gradient section, the air at the bottom of the boundary layer accelerates under the action of the pressure, but the speed only increases a little due to the influence of friction. In the adverse pressure gradient section, the air at the bottom layer of the boundary layer is double impeded by friction and inverse pressure, the deceleration is fast. When it reaches a certain point, the air flow rate close to the surface of the rotor blade 74 is reduced to zero. The speed gradient is $(\partial V/\partial y)$ y=0. Further, the air at the bottom of the boundary layer begins to flow backwards from the back under the effect of the inverse pressure. The air flowing backwards meets the air flowing down, causing the boundary layer air to accumulate and detach from the airfoil, then is swept away by the mainstream to generate a large number of vortices. In this way, the boundary layer airflow cannot flow close to the airfoil, and flow separation (also called boundary layer separation) occurs. The flow separation will reduce the lift power, increase the resistance, which will cause the propeller efficiency decrease.

In the design process of the rotor blade 74, it is generally desirable that under the working condition the propeller surface flows is near to the wall, no flow separation occurs, therefore the selection of the airfoil style is essential. However, during flight the propeller rotation speed will largely varies, sometimes the blade angle of attack also varies, which makes it difficult to ensure complete wall flow during the working condition. Flow separation generally occurs at the upper surface of the blade, near the trailing edge. In the bad case, the separation point will move forward, and even worse will be separated at the leading edge of the blade, so the flow separation of the propeller is unavoidable.

The noise emitted by the rotor blade 74 can be divided into two parts: rotational noise (discrete noise) and broadband noise. Rotational noise is created by the periodic interaction of the blade with the incoming flow, while broadband noise is produced by the random pulsating interaction of the blade with the surrounding flow field. Numerous studies have shown that rotational noise is the main noise of the propeller, so the research work on propeller noise is mainly focus on the rotational noise.

Rotating noise can be further divided into thickness noise, load noise and nonlinear noise. Thickness noise is a rotating monopole noise caused by the finite thickness of the blade. Load noise is the rotating dipole noise caused by blade lift and drag. Nonlinear noise, also known as quadrupole noise, includes both nonlinear noise sources and nonlinear propagation effects. It is also a single-tone noise with a blade rotation frequency as the fundamental frequency. Thus, for subsonic propeller noise, thickness noise and load noise are the main noises, with load noise being the most important noise. The load noise is mainly caused by the pressure field change of the blade surface, and the flow separation on the blade surface will cause the pressure field change drastically. Therefore, the load noise can be effectively reduced by reducing the separation zone.

Turbulence has a stronger ability to bear inverse pressure than laminar flow, thereby delaying flow separation. In order to avoid or weaken the separation, it is desirable to convert the laminar flow into turbulence as early as possible. By increasing the freestream turbulence, increasing the wall roughness, adding a twist line at the initial point of the boundary layer, or acoustic excitation, blowing, etc., the transfer will be accelerated.

The vortex generator 98 is an effective flow control device. When the airflow flows through the vortex generator 98, a flow vortex is generated to enhance the energy exchange between the low-energy fluid and the mainstream high-energy fluid in the boundary layer, and the boundary layer separation can be delayed in the inverse pressure gradient.

The vortex generator 98 on a conventional aircraft is very large, which will cause some problem if directly applied to UAV propellers or rotor blades. This document details the analysis of the flow condition of the rotor blade 74 using the vortex generators of the present invention. At last the effect is remarkable.

During the propeller design process, the flow separation zone of the propeller is roughly predicted by experiment or simulation, and the flow is disturbed by setting protrusions or depressions before the separation zone, i.e., the vortex generator, to increase the lift power, reduce resistance and noise level.

The vortex generator 98 can use the protrusion or depression form. The protrusion or depression, i.e., generator portions 110, are generally arranged on the surface of the rotor blade 74 and is set according to the position of the specific separation point. Different propellers or blades have different position (the detailed separation point position can be determined by wind tunnel experiment or flow visualization or other technical measurements). Generally, the position is in the middle leading edge of blade, it may also be located at the middle back edge for special type of blade. The concave and convex setting forms are various, which may be strips, blocks, dots, regular patterns or irregular patterns. The height of the protrusion or the depth of the depression is generally between 0.2% and 5% of the chord length of the local airfoil.

When micro vortex generator 98 is relatively thin, the micro vortex generator 98 can be used to roughen the surface of the rotor blade 74, and some convex or concave patterns can be applied. For example, when a propeller diameter is 15 inches or less, the micro vortex generator can be applied by texturing or laser engraving; or by adding an external attachment on the blade surface such as a tape, in this case the thickness is generally only about 0.05-0.2 mm.

As shown in the FIG. 5, by providing a propeller vortex generator 98, it is possible to roll up the Airflow direction vortex (represented by arrow 101) when the airflow flows through the vortex generator 98, to increase the energy exchange in the boundary layer, and delay the separation.

The position of the micro propeller vortex generator 98 is very important. The specific position needs to be determined according to the flow separation point. For some blades, the separation point is not necessarily a straight line, therefore the vortex generator layout form is also diverse, can be set either in one or more rows. Different from the entire blade is rough, the flow of the entire blade surface is a turbulent flow, in this case the frictional resistance in the unseparated area will increase and will decrease the lift-to-drag ratio. Unlike rough machining of the entire blade, the vortex generator 98 is set in front of the flow separation point, to ensure that the flow before the flow separation is still laminar flow. This will reduce the frictional resistance, and at the same time, the small-scale vortex is generated closer to the downstream, and the noise caused by the separation zone is greatly reduced. There is not much extra noise produced. Experiments shows that when the micro vortex generators are placed in different chord positions, the efficiency can be improved correspond to different propeller rotation speed. To set the vortex generators in the leading edge of the rotor blade will improve the low speed characteristics; and when moving away the generators 98 from the leading edge will improve the high-speed characteristics.

The height of the micro vortex generator 98 is very crucial, if the height is too low, there is no interference effect, the required scale of flow vortex cannot be rolled up. If the height is too high, excessive resistance will be produced, this will even lead to the flow separation. The study found that the height range of the micro vortex generator is fittable to set at about 0.2%-5% of the local airfoil chord length. The blade surface roughness can be considered as a type of micro-vortex generator, which will achieve the same effect.

The raised or recessed material is not limited and can be generated at the same time as the blade is manufactured (for example, during injection molding process), or can be attached in later steps.

During the test, an analog micro vortex generator was attached by adding a paper tape to the front edge of the upper surface of the propeller or blade. Compare the force and noise conditions of the base blade and the modified blade.

As shown in Tables 1 and 2 illustrated in FIGS. 11 and 12, the efficiency is significantly improved by attaching the modified blade of the micro vortex generator to the front position of the propeller. The propeller efficiency improvement is about 5.3%, near 4000 rpm.

Figure 13:
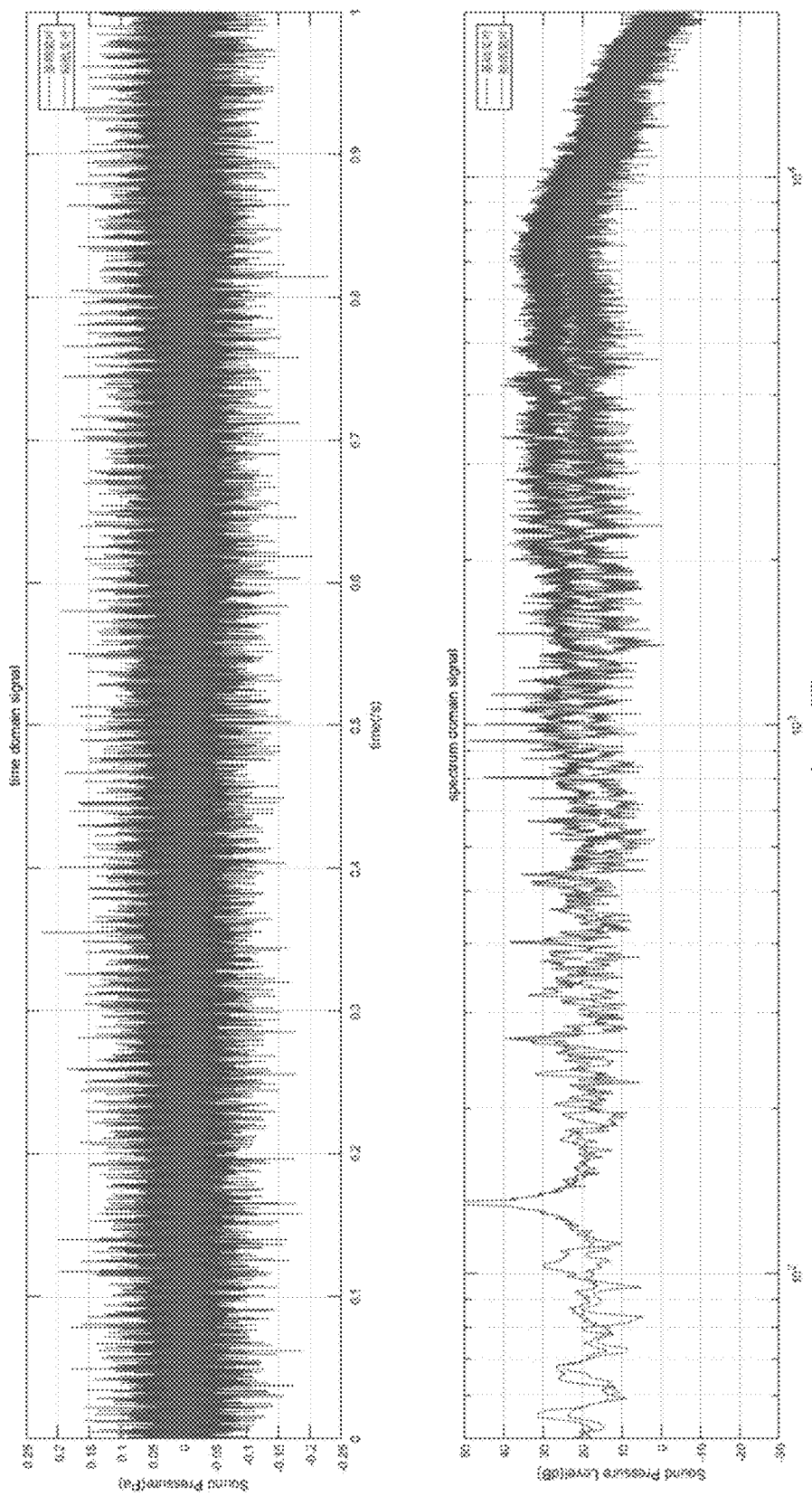
FIG. 13 illustrates a comparison of noise of a paddle through a vortex generator.

Using a decibel meter to test the single-blade noise at 4000 rpm, result shows that the base blade decibel meter reading range is 69-70 dB, and the decibel meter reading range is 61-62 dB at the same rotor speed with the processed blade. The noise can be reduced by 7±2 dB, the noise reduction effect is obvious. The blade noise at 4000 rpm was analyzed using a recording device, and the spectrum is shown in FIG. 13.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An unmanned aerial vehicle, comprising:
a fuselage body; and
a lift mechanism including a rotor blade assembly and a rotary driving member and defining an axis of rotation, the lift mechanism being coupled to the fuselage body, the rotary driving member being configured to controllably rotate the rotor blade assembly about the axis of rotation, the rotor blade assembly including a pair of opposing rotor blades, each rotor blade having an upper surface and including an associated vortex generator defined along the upper surface wherein the rotor blade assembly includes a rotor blade attachment mechanism and each rotor blade includes an associated longitudinal spanwise axis that extends between a root portion and an opposing tip portion and a chordwise axis that extends between a leading edge and a trailing edge, each rotor blade being mounted to the rotor blade attachment mechanism at the root portion, wherein each vortex generator extends along the longitudinal spanwise axis, each vortex generator having a length along the longitudinal spanwise axis being over half a distance between the root portion and the opposing tip portion, wherein each rotor blade has a chord length defined by a distance along the chordwise axis between the leading edge and the trailing edge, the height or depth of each vortex generator, relative to the upper surface of the associated rotor blade, being between 0.2% and 5% of the chord length, wherein the associated vortex generator of each rotor blade includes a first row including a first plurality of generator portions and a second row including a second plurality of generator portions, wherein at least some of the generator portions in the first row have a first shape identical to an adjacent generator portion and at least some of the generator portions in the second row having a second shape, the second shape being a portion of the first shape, wherein the associated vortex generator is created by roughening the upper surface of each rotor blade.

2. An unmanned aerial vehicle, as set forth in claim 1, wherein each rotor blade and the associated vortex generator being unitarily formed.

3. An unmanned aerial vehicle, as set forth in claim 1, wherein each rotor blade is formed using an injection molding process.

4. A rotor blade assembly for use in an aerial vehicle, the aerial vehicle including a fuselage body and a lift mechanism, the lift mechanism including a rotary driving member and defining an axis of rotation, the lift mechanism being coupled to the fuselage body, the rotary driving member being configured to controllably rotate the rotor blade assembly about the axis of rotation, comprising:
a pair of opposing rotor blades, each rotor blade having an upper surface, and
an associated vortex generator defined along the upper surface of each rotor blade, the rotor blade assembly includes a rotor blade attachment mechanism and each rotor blade having an associated longitudinal spanwise axis extending between a root portion and an opposing tip portion and an associated chordwise axis extending between a leading edge and a trailing edge along a chord wise axis, each rotor blade being mounted to the rotor blade attachment mechanism at the root portion, wherein each rotor blade has a chord length defined by a distance along the chordwise axis between the leading edge and the trailing edge, the height or depth of each vortex generator, relative to the upper surface of the associated rotor blade, being between 0.2% and 5% of the chord length, each vortex generator having a length along the longitudinal spanwise axis being over half a distance between the root portion and the opposing tip portion, wherein the associated vortex generator of each rotor blade includes a first row including a first plurality of generator portions and a second row including a second plurality of generator portions, wherein at least some of the generator portions in the first row have a first shape identical to an adjacent generator portion and at least some of the generator portions in the second row having a second shape, the second shape being a portion of the first shape, wherein the associated vortex generator is created by roughening the upper surface of each rotor blade.

5. A rotor blade assembly, as set forth in claim 4, wherein each rotor blade and the associated vortex generator being unitarily formed.

6. A rotor blade assembly, as set forth in claim 4, wherein each rotor blade is formed using an injection molding process.

\* \* \* \* \*